US008904342B2

(12) United States Patent
Bauder et al.

(10) Patent No.: US 8,904,342 B2
(45) Date of Patent: Dec. 2, 2014

(54) SYSTEM AND METHOD FOR RAPID DEVELOPMENT OF SOFTWARE APPLICATIONS

(75) Inventors: Warren White Bauder, Bozeman, MT (US); Peter Andrew Quinlan, Colorado Springs, CO (US); Robert Lee Banfill, Bozeman, MT (US); Kevin R. Fletcher, Belgrade, MT (US); Gretchen Andes Bauder, Bozeman, MT (US); Ryan G. Sasser, Wilsall, MT (US); Thomas H. Johnson, Bozeman, MT (US)

(73) Assignee: Zoot Enterprises, Inc., Bozeman, MT (US)

( * ) Notice: Subject to any disclaimer, the term of this patent is extended or adjusted under 35 U.S.C. 154(b) by 835 days.

(21) Appl. No.: 12/529,057

(22) PCT Filed: Apr. 27, 2008

(86) PCT No.: PCT/US2008/061701
§ 371 (c)(1),
(2), (4) Date: Oct. 13, 2009

(87) PCT Pub. No.: WO2008/147616
PCT Pub. Date: Dec. 4, 2008

(65) Prior Publication Data
US 2011/0016448 A1    Jan. 20, 2011

Related U.S. Application Data (60) Provisional application No. 60/940,342, filed on May 25, 2007.

(51) Int. Cl.
*G06F 9/44*    (2006.01)

(52) U.S. Cl.
CPC ... *G06F 8/34* (2013.01); *G06F 8/20* (2013.01)
USPC .......... 717/104; 171/105; 171/136; 171/174; 171/175

(58) Field of Classification Search
USPC .................................. 717/104, 105
See application file for complete search history.

(56) References Cited

U.S. PATENT DOCUMENTS

| 5,384,910 A | 1/1995 | Torres |
| 5,603,034 A | 2/1997 | Swanson |
| 5,640,501 A | 6/1997 | Turpin |
| 5,640,577 A | 6/1997 | Scharmer |
| 5,710,900 A | 1/1998 | Anand et al. |
| 5,758,126 A | 5/1998 | Daniels et al. |
| 5,900,870 A * | 5/1999 | Malone et al. ................ 715/866 |

(Continued)

OTHER PUBLICATIONS

Embley ("Relational Database Reverse Engineering: A Model-Centric, Transformational, Interactive Approach Formalized in Model Theory"), 1997.*

*Primary Examiner* — Chat Do
*Assistant Examiner* — Jae Jeon
(74) *Attorney, Agent, or Firm* — Antoinette M. Tease (57) ABSTRACT

The present invention is a system and method for rapid development of software applications comprising; a field composer; a design composer; and a design repository; wherein the field composer is used to create field trees; wherein the design composer is used to create designs; wherein a design is a partial or complete configuration of a software application; wherein one or more data models is/are derived from one or more existing databases; and wherein the design repository stores designs, field trees, and data models.

69 Claims, 6 Drawing Sheets

(56) References Cited

U.S. PATENT DOCUMENTS

| | | |
|---|---|---|
| 6,137,488 A | 10/2000 | Kraft et al. |
| 6,415,259 B1 * | 7/2002 | Wolfinger et al. ........... 705/7.13 |
| 6,496,203 B1 | 12/2002 | Beaumont et al. |
| 6,898,783 B1 * | 5/2005 | Gupta et al. .................. 717/105 |
| 6,996,561 B2 | 2/2006 | de Hilster et al. |
| 7,076,766 B2 * | 7/2006 | Wirts et al. .................. 717/121 |
| 2003/0085918 A1 | 5/2003 | Beaumont et al. |
| 2003/0107597 A1 | 6/2003 | Jameson |
| 2003/0146937 A1 | 8/2003 | Lee |
| 2004/0107414 A1 * | 6/2004 | Bronicki et al. .............. 717/105 |
| 2004/0205487 A1 | 10/2004 | Albert et al. |
| 2005/0034107 A1 * | 2/2005 | Kendall et al. ................ 717/136 |
| 2005/0066280 A1 | 3/2005 | Austin et al. |
| 2005/0125715 A1 | 6/2005 | Di Franco et al. |
| 2006/0020619 A1 * | 1/2006 | Netz et al. .................... 707/102 |
| 2006/0235871 A1 * | 10/2006 | Trainor et al. ................ 707/102 |
| 2008/0249895 A1 * | 10/2008 | Mariotti ........................ 705/27 |
| 2009/0064322 A1 * | 3/2009 | Finlayson et al. ............. 726/21 |

* cited by examiner

SYSTEM AND METHOD FOR RAPID DEVELOPMENT OF SOFTWARE APPLICATIONS

CROSS-REFERENCE TO RELATED APPLICATION

This application claims priority back to U.S. Patent Application No. 60/940,342 filed on 25 May 2007. The contents of that application are hereby incorporated by reference into the present disclosure.

BACKGROUND OF THE INVENTION

1. Field of the Invention

The present invention relates generally to the field of computer-implemented inventions, and more specifically, to a system and method for rapid development of software applications.

2. Description of the Related Art

Virtually every large company in the world uses an automated business system in some part of their business. These systems vary, but almost all of them have the requirement to display information and accept input from end users. Examples of automated business systems run the gamut from online retail sites to delivery truck routing systems to insurance industry customer interfaces. Because building automated business systems is a complex and technically challenging process, business users with average computer skills cannot create, modify, or maintain them without employing the expertise of software engineers or programmers. Furthermore, most automated business systems require interactions with sub-components, such as a database, which furthers the need for the interface to be controlled by a software engineer.

These constraints make automated business system builds a lengthy and prohibitively expensive process. Business users need an easy and efficient way to build custom automated business systems that include visual design elements of display pages (front-end interfaces) connected to a database (interface to the back end). The automated business system needs to be built through a user-friendly interface that does not require technical knowledge.

Additionally, the software development industry has gone through a series of changes to address the shortcomings of developing automated business systems. In the past, automated business systems were mainframe-based with primitive visual interfaces called green screens. Developers of these systems had limited choices for constructing usable and intuitive front-end interfaces. With the growth of the Internet, these options expanded rapidly. HTML, Java, and other programming environments provided new, visually oriented methods for development and powerful ways to create a new generation of automated business systems; however, they brought about a new set of challenges.

Back in the mainframe age, component connections were simple to manage because components were tied together by one central system. Today, through the Internet, systems are accessible from anywhere on the network, and there now exists the ability to connect different components from multiple data and service providers into one interdependent system. While the new capabilities of the Internet have added flexibility in the creation of user-friendly, front-end visual interfaces, this flexibility increases the importance of standards and interfaces between systems. Consequently, software engineers continue to be a necessity for the creation of visual widgets and for tying these widgets to the back-end interfaces. The need for software engineers to be involved in every step of development puts limits on the "advances" these technologies have made.

Furthermore, the use of automated business systems has become increasingly critical to the success of businesses that use them. Millions of dollars are at stake when these systems shut down; therefore, failure is not acceptable, and uptime and availability performance are paramount. The environment in which these automated business systems need to perform in today's world must also be taken into consideration. With fraud loss on the increase, environment security has become vitally important. Compliance with government regulation designed to protect consumers has also become a requirement of any automated business system.

There are no automated business systems on the market that successfully address all of these issues. An automated business system in today's world must retain the benefits of the Internet, and still provide a user-friendly interface that allows non-technical business users to quickly build, modify, and maintain automated business systems with front-end visual interfaces that are connected to a database that processes and stores high-volume, mission-critical data. The system must also address uptime and availability requirements, as well as security and compliance issues.

BRIEF SUMMARY OF THE INVENTION

The present invention is a system for rapid development of software applications comprising: a field composer; a design composer; and a design repository; wherein the field composer is used to create field trees; wherein the design composer is used to create designs; wherein a design is a partial or complete configuration of a software application; wherein one or more data models is/are derived from one or more existing databases; and wherein the design repository stores designs, field trees, and data models.

In a preferred embodiment, a design comprises programmer-created pages, programmer-created frames, tool-created pages, and/or tool-created frames. Preferably, the system further comprises a central server and a client, wherein the central server connects to the design repository and retrieves designs, field trees and data model(s); wherein the client displays in a runtime environment the software application that is created in the design composer; and wherein an end user enters, edits and/or reviews data through the client using the software application that is created in the design composer.

In a preferred embodiment, the central server uses the data model(s) to connect to one or more customer databases; wherein the database from which each data model is derived has a schema; wherein each customer database has a schema; and wherein the schema of the database from which each data model is derived matches the schema of at least one customer database. Preferably, the customer database is used by the software application to store and retrieve data entered by the end user through the client.

In a preferred embodiment, the system further comprises a persistence layer, wherein each customer database has a native database query format; and wherein the persistence layer translates the data entered by the end user to the native database query format of the customer database. Preferably, more than one data model is used per software application created in the design composer. The data models are preferably derived from different types of databases.

In a preferred embodiment, there is a one-to-one relationship between the number of data models used per software application created in the design composer and the number of customer databases. Preferably, a data modeling standard is used to automatically infer the structure of the database schema of the database from which the data model is to be derived. After the data modeling standard is used to automatically infer the structure of the database schema of the database from which the data model is to be derived, the data model is preferably derived using a reverse engineering tool.

In a preferred embodiment, the field composer comprises a data model view and a field view; wherein each data model comprises fields; wherein the data model view is automatically populated with the fields from the data model(s); and wherein to create a field tree in the field composer, a business user drags and drops data elements from the data model view to the field view of the field composer. Preferably, the design composer comprises a field tree window, and the field tree created in the field composer is displayed in the field tree window of the design composer.

In a preferred embodiment, a field tree may be built from more than one data model, and each data model is represented by a root in the field tree. Preferably, the field tree created in the field composer and displayed in the field tree window of the design composer maps the data elements to one or more customer databases.

In one embodiment, the system further comprises a persistence layer, wherein the persistence layer is an application programming interface that communicates with an object model persistence application programming interface. In an alternate embodiment, the persistence layer is an application programming interface that communicates directly with one or more data models.

In a preferred embodiment, the persistence layer is used within the field composer to create a hierarchical view of a relational data model. The field composer preferably comprises a data model view, and the hierarchical view of the data model is displayed in the data model view of the field composer.

In a preferred embodiment, each data model comprises fields, and the field composer allows business users to select data model(s) and specific fields from a data model for use on specific pages of the software application. Preferably, the field composer comprises a data model view and a field view, wherein all available fields within a selected data model appear in the data model view of the field composer, and wherein the selected fields appear in the field view. The selected fields are preferably automatically saved and grouped according to the data model from which they came.

In a preferred embodiment, a single field tree is created for each software application, and the design composer is used to build the software application using the field tree that is created in the field composer. Preferably, the software application comprises one or more pages, wherein each page comprises a visual display, and wherein the design composer is used to configure the visual display of the pages in the software application.

In a preferred embodiment, the design composer comprises a properties window, a field tree window, a pages window, a palette window and a canvas. Optionally, the design composer further comprises a frames window.

In a preferred embodiment, the software application comprises one or more pages, and the canvas is where business users design, build and modify the pages of the software application. Preferably, the software application comprises one or more pages, the pages comprise design elements, and the properties window is used to format the design elements of the pages. In one embodiment, the software application has a page flow, and the page flow is defined in the properties window. In another embodiment, the software application has a page flow, and page flow is controlled by events on buttons that have been dragged and dropped onto the canvas from the palette window.

In a preferred embodiment, the software application comprises one or more pages, and the field tree window is where a business user selects the field(s) he wants to use on a page. Preferably, the software application comprises one or more pages, and the pages window is used to add, delete, modify and rename pages. Preferably, the pages window allows a business user to add programmer-created pages to the software application.

In a preferred embodiment, the software application comprises one or more pages, and the palette window is used to add design elements to a page. Preferably, the design elements that are added from the palette window are arranged and sized on the canvas. Preferably, a user may select a button from the palette window, drag and drop the button onto the canvas, and select an action from the properties window to apply to the button.

In a preferred embodiment, the software application comprises one or more pages, and the frames window is used to add one or more frames to a page. Preferably, each frame comprises one or more design elements, and when a design element in a frame is modified, the modification propagates to every place in a design in which the frame is used.

In a preferred embodiment, the software application comprises one or more pages, and to build a page, a business user selects one or more fields from the field tree window of the design composer and places them onto the canvas. Preferably, the fields placed onto the canvas form a layout, and the layout displayed on the canvas is identical to that which will appear to an end user in a runtime environment.

In a preferred embodiment, when a design is completed, the design is saved to the design repository. Preferably, modified designs are saved as new versions, and both new and prior versions are available for use in the design composer. Preferably, when a design is completed and ready to be run in a runtime environment, the design is deployed from the design repository to a central server.

In a preferred embodiment, the design repository is used to test the software application before it is deployed to the runtime environment. Preferably, designs, fields trees and data models that are stored in the design repository are shared across multiple platforms and between end users.

In a preferred embodiment, the software application is run in a runtime environment, wherein the runtime environment provides for user permissions, and wherein the user permissions include permissions for accessing the application, permissions for accessing specific pages, and permissions for accessing specific fields.

The present invention is also a method for rapid development of software applications comprising: providing a field composer; providing a design composer; and providing a design repository; wherein the field composer is used to create field trees; wherein the design composer is used to create designs; wherein a design is a partial or complete configuration of a software application; wherein one or more field trees is/are derived from one or more existing data models; and wherein the design repository stores designs, field trees, and data models.

In a preferred embodiment, a design comprises programmer-created pages, programmer-created frames, tool-created pages, and/or tool-created frames. Preferably, the method further comprises providing a central server and a client, wherein the central server connects to the design repository and retrieves designs, field trees and data model(s); wherein the client displays in a runtime environment the software application that is created in the design composer; and wherein an end user enters, edits and/or reviews data through the client using the software application that is created in the design composer.

In a preferred embodiment, the central server uses the data model(s) to connect to one or more customer databases; wherein the database from which each data model is derived has a schema; wherein each customer database has a schema; and wherein the schema of the database from which each data model is derived matches the schema of at least one customer database. Preferably, the customer database is used by the software application to store and retrieve data entered by the end user through the client.

In a preferred embodiment, the method further comprises providing a persistence layer, wherein each customer database has a native database query format; and wherein the persistence layer translates the data entered by the end user to the native database query format of the customer database. Preferably, more than one data model is used per software application created in the design composer. The data models are preferably derived from different types of databases.

In a preferred embodiment, there is a one-to-one relationship between the number of data models used per software application created in the design composer and the number of customer databases. Preferably, a data modeling standard is used to automatically infer the structure of the database schema of the database from which the data model is to be derived. After the data modeling standard is used to automatically infer the structure of the database schema of the database from which the data model is to be derived, the data model is preferably derived using a reverse engineering tool.

In a preferred embodiment, the field composer comprises a data model view and a field view; wherein each data model comprises fields; wherein the data model view is automatically populated with the fields from the data model(s); and wherein to create a field tree in the field composer, a business user drags and drops data elements from the data model view to the field view of the field composer. Preferably, the design composer comprises a field tree window, and the field tree created in the field composer is displayed in the field tree window of the design composer.

In a preferred embodiment, a field tree may be built from more than one data model, and each data model is represented by a root in the field tree. Preferably, the field tree created in the field composer and displayed in the field tree window of the design composer maps the data elements to one or more customer databases.

In one embodiment, the method further comprises providing a persistence layer, wherein the persistence layer is an application programming interface that communicates with an object model persistence application programming interface. In an alternate embodiment, the persistence layer is an application programming interface that communicates directly with one or more data models.

In a preferred embodiment, the persistence layer is used within the field composer to create a hierarchical view of a relational data model. The field composer preferably comprises a data model view, and the hierarchical view of the data model is displayed in the data model view of the field composer.

In a preferred embodiment, each data model comprises fields, and the field composer allows business users to select data model(s) and specific field from a data model for use on specific pages of the software application. Preferably, the field composer comprises a data model view and a field view, wherein all available fields within a selected data model appear in the data model view of the field composer, and wherein the selected fields appear in the field view. The selected fields are preferably automatically saved and grouped according to the data model from which they came.

In a preferred embodiment, a single field tree is created for each software application, and the design composer is used to build the software application using the field tree that is created in the field composer. Preferably, the software application comprises one or more pages, wherein each page comprises a visual display, and wherein the design composer is used to configure the visual display of the pages in the software application.

In a preferred embodiment, the design composer comprises a properties window, a field tree window, a pages window, a palette window and a canvas. Optionally, the design composer further comprises a frames window.

In a preferred embodiment, the software application comprises one or more pages, and the canvas is where business users design, build and modify the pages of the software application. Preferably, the software application comprises one or more pages, the pages comprise design elements, and the properties window is used to format the design elements of the pages. In one embodiment, the software application has a page flow, and the page flow is defined in the properties window. In another embodiment, the software application has a page flow, and page flow is controlled by events on buttons that have been dragged and dropped onto the canvas from the palette window.

In a preferred embodiment, the software application comprises one or more pages, and the field tree window is where a business user selects the field(s) he wants to use on a page. Preferably, the software application comprises one or more pages, and the pages window is used to add, delete, modify and rename pages. Preferably, the pages window allows a business user to add programmer-created pages to the software application.

In a preferred embodiment, the software application comprises one or more pages, and the palette window is used to add design elements to a page. Preferably, the design elements that are added from the palette window are arranged and sized on the canvas. Preferably, a user may select a button from the palette window, drag and drop the button onto the canvas, and select an action from the properties window to apply to the button.

In a preferred embodiment, the software application comprises one or more pages, and the frames window is used to add one or more frames to a page. Preferably, each frame comprises one or more design elements, and when a design element in a frame is modified, the modification propagates to every place in a design in which the frame is used.

In a preferred embodiment, the software application comprises one or more pages, and to build a page, a business user selects one or more fields from the field tree window of the design composer and places them onto the canvas. Preferably, the fields placed onto the canvas form a layout, and the layout displayed on the canvas is identical to that which will appear to an end user in a runtime environment.

In a preferred embodiment, when a design is completed, the design is saved to the design repository. Preferably, modified designs are saved as new versions, and both new and prior versions are available for use in the design composer. Preferably, when a design is completed and ready to be run in a runtime environment, the design is deployed from the design repository to a central server.

In a preferred embodiment, the design repository is used to test the software application before it is deployed to the runtime environment. Preferably, designs, fields trees and data models that are stored in the design repository are shared across multiple platforms and between end users.

In a preferred embodiment, the software application is run in a runtime environment, wherein the runtime environment provides for user permissions, and wherein the user permissions include permissions for accessing the application, permissions for accessing specific pages, and permissions for accessing specific fields.

REFERENCE NUMBERS

1 Design environment
2 Field composer
3 Design composer
4 Design repository
5 Data model
6 Database (from which data model is derived)
7 Customer database
8 Central server
9 Client
10 Runtime environment
11 Persistence layer
12 Field view (of field composer)
13 Data model view (of field composer)
14 Properties window (of design composer)
15 Field tree window (of design composer)
16 Pages window (of design composer)
17 Frames window (of design composer)
18 Palette window (of design composer)
20 Canvas
21 Tab style field type (of design composer)
22 Table style field type (of design composer)
23 Panel style field type (of design composer)

DETAILED DESCRIPTION OF INVENTION

1. Overview

The present invention is a system and method that allows for the rapid development of software applications, such as automated business systems. The invention is user-friendly and can be used by non-technical business users to build, modify, and maintain automated business systems, including front-end visual components that connect to a database for processing in the company's distributed network. The present invention provides this capability with minimal intervention by software engineers.

The present invention is comprised of three main components: the design environment, the design repository, and the runtime environment. These components work together to create a software application wherein the fields, display format, and databases to which the application connects are all determined by the business user.

The design environment comprises a field composer and a design composer. The field composer and design composer run locally as an application (without a browser). As a result of selections made by the business user in the field and design composers, the present invention automatically generates all database interactions based on the fields that business users place on each page. It also allows business users to define the visual aspects of an automated business system, including individual page layout, page groupings, and page navigation.

The design repository stores artifacts, which within the context of the present invention means designs, field trees, and data models. As used herein, the term "design" refers to a partial or complete configuration of an application created with the present invention. A design may comprise: (i) programmer-created pages and frames that are created by the company's software engineers; and/or (ii) tool-created pages and frames that are created by business users with the invention. Programmer-created pages allow the invention to provide for complex functions and pages that cannot be built without programmer intervention. Programmer-created pages must adhere to software framework specifications that allow the programmer-created pages to interact correctly with the invention. Both programmer-created pages and frames and tool-created pages and frames offer a jump start on creating automated business systems by providing common functions that can be used and reused.

Business users who have permissions to the system have access to the design repository. The design repository acts as a library where artifacts can be shared by multiple business users to facilitate quicker builds. The number of artifacts that can be stored in the design repository is unlimited, and business users have the option of deciding which artifacts, if any, they want to use. Furthermore, designs can be versioned and saved for future use or reference.

The runtime environment is the real-time setting in which the software applications designed through the use of the present invention work. The runtime environment is preferably shared, distributed, scalable, and redundant. Preferably, it is also capable of processing high-volume, real-time transactions in a mission-critical environment that requires the highest level of security.

With these three main components—the design environment, the design repository, and the runtime environment—the present invention combines unprecedented ease of use with the ability to build, modify, maintain, and deploy automated business systems. These systems can be built by non-technical business users with average computer skills, which makes the entire process efficient and cost-effective.

Figure 1:
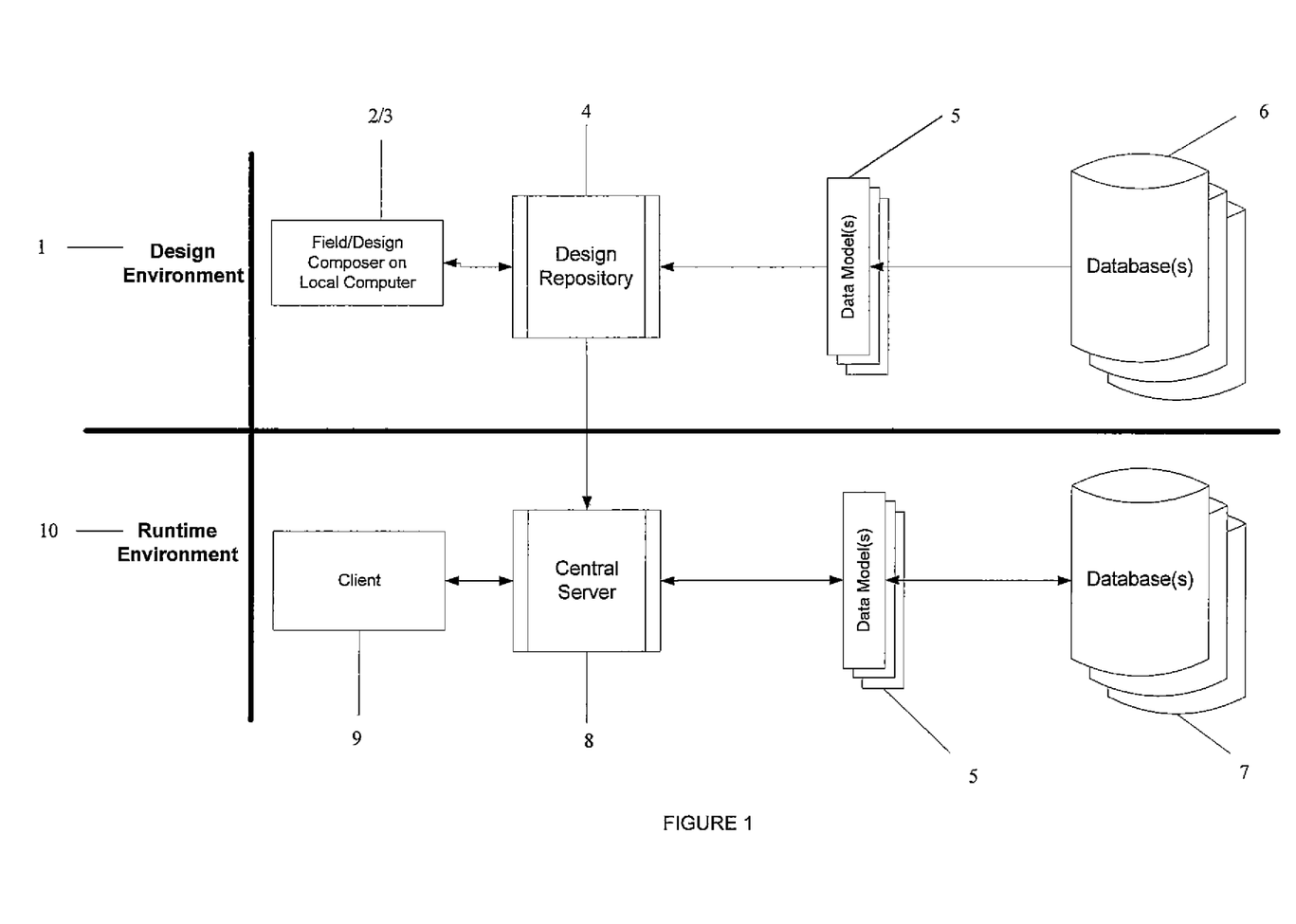
FIG. 1 is a diagram of the technical architecture of the present invention.

FIG. 1 depicts the technical architecture of the system, including the relationships between the main components of the system and the users of the system. The users of the system include (i) the business user who creates the system in the design environment 1 and (ii) the end user who enters data into the system for processing in the runtime environment 10. As shown in FIG. 1, the business user runs the invention (field composer and design composer 2, 3) on a local computer to create field trees and designs. The field trees (there is one field tree per design) and designs are then stored in the design repository 4.

Data models 5 are derived from one or more existing databases 6 and stored in the design repository 4. One data model 5 is derived from a single database 6. In the runtime environment 10, the end user runs the client 9, which displays the design that was created in the design environment 1. The central server 8 connects to the design repository 4 and retrieve artifacts necessary to run the application that was created in the design environment 1. The central server 8 uses the data model(s) 5 to connects to the customer database(s) 7. The central server could be one or more central servers.

The database 6 from which each data model 5 is derived has a schema, and that schema must match the schema of the corresponding customer database 7. Note that it is possible for the database 6 from which the data model 5 is derived and the customer database 7 to be the same database, although it would be unlikely in most business scenarios. The present invention may utilize more than one data model 5 per application. The customer database 7 is used by the automated business system to store and retrieve data entered by the end user through the client 9.

2. Design Environment
A. Data Models

The present invention is designed to work with a database through a data model without the need for programmer intervention. As stated above, the data model 5 is derived from an existing database 6. The present invention utilizes a data modeling standard to enable the system to automatically infer the structure of the database schema of the database 6 from which the data model is being derived. Once the structure of the database schema is known, the data model 5 can be derived.

In a preferred embodiment, the data modeling standard includes various naming conventions that are applied to the database in order to identify structures and data types within the database. The data modeling standard also includes naming conventions for tables and columns of the database in order to identify tables within the database and the relationships between them. For example, in one embodiment, the data modeling standard includes certain criteria for type tables, collections (i.e., the many end of a one-to-many or many-to-many relationship), and Boolean types.

In a preferred embodiment, after the data modeling standard is applied, the data model 5 is reverse engineered from a database 6 using Hibernate Tools, a commercially available reverse engineering tool. This tool inspects an existing database and produces a data model that represents the schema of the inspected database. The present invention is not limited to the use of Hibernate Tools, however, and the data model could be generated using any other method that accomplishes that same result.

Once created, the data model 5 can be updated with new tables and/or fields as the database 6 changes. A database administrator updates the database schema from which the data model 5 was derived (that is, the database schema for database 6), after which the data model is recreated to include the changes to the database schema. The business user then has the option of promoting the new table and/or field from the data model view (see reference number 13 in FIG. 3) to the field view (see reference number 12 in FIG. 3) in the field composer 2. The business user would then need to open up the design composer 3 and load the new field tree in order for the changes to be available for design.

The present invention is not limited to the use of a specific data model. Business users can select different data models to create different types of software applications, or they may use different data models within the same software application. For example, a business user may select a home loan data model (i.e., a data model derived from the database schema of a home loan database) and a credit card data model (i.e., a data model derived from the database schema of a credit card database) to build a loan origination system.

Each application is connected to a database 7 with the same database schema from which the data model was derived (database 6), and if more than one data model is used, then the application connects to one database 7 for each data model 5 used. In other words, there is a one-to-one relationship between the number of data models 5 used within the context of a single application and the number of databases 7 used by the customer when the application is deployed. Further, data models 5 can be derived from different types of databases, including databases that utilize non-traditional storage methods.

B. Persistence Layer

Figure 2:
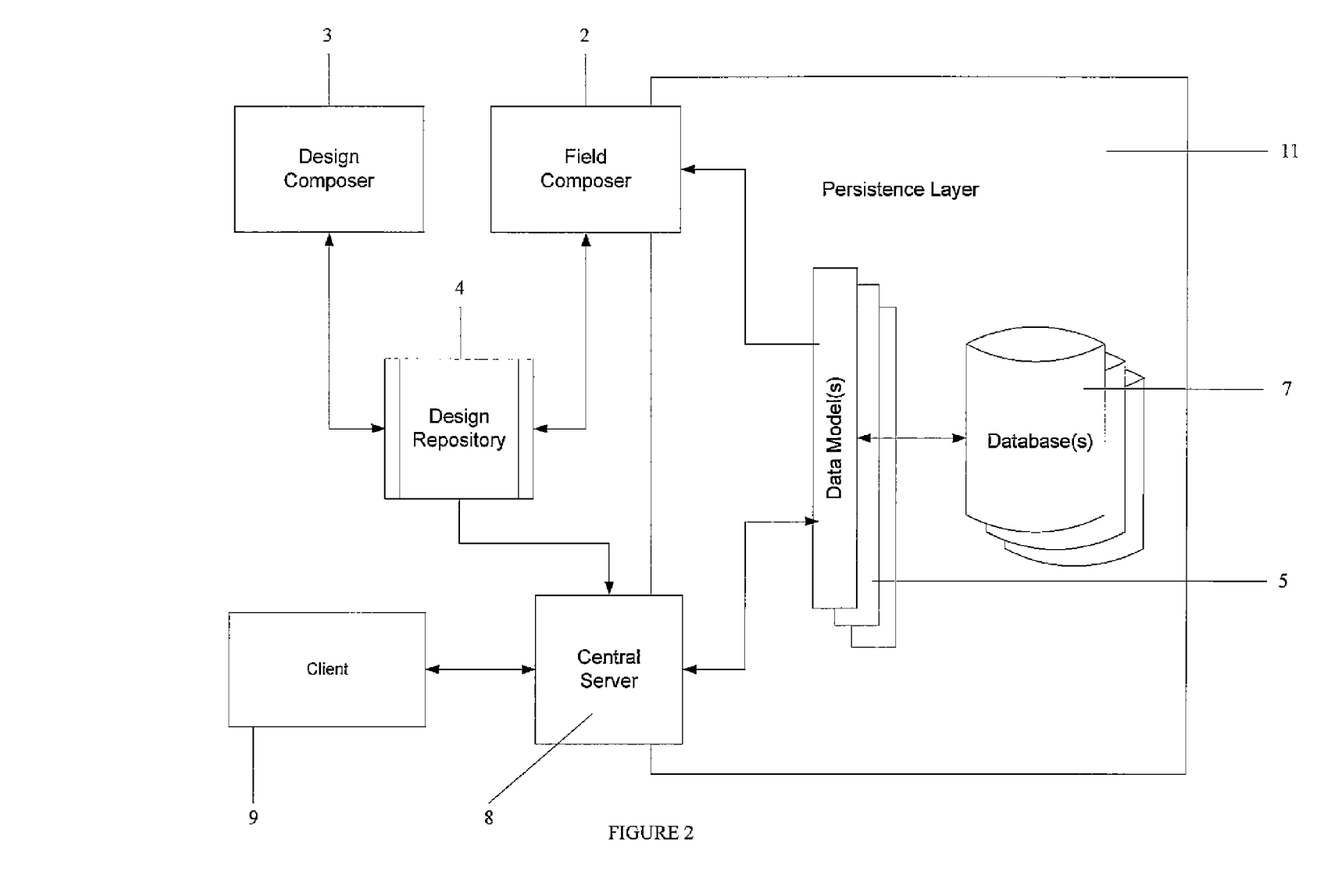
FIG. 2 is a diagram of the technical architecture of the present invention with the persistence layer shown.

The present invention uses a persistence layer 11 to communicate with the database 7. FIG. 2 is a diagram of the technical architecture of the present invention with the persistence layer 11 shown.

In a preferred embodiment, the persistence layer 11 is an application programming interface (API) that communicates with the Hibernate API, which in turn communicates with one or more data models 5. In lieu of the Hibernate API, any object model persistence API could be used. In an alternate embodiment, the persistence layer 11 is an API that communicates directly with one or more data models 5.

The persistence layer 11 acts as a translator between the database 7 and the business user's automated business system that has been generated by the invention. Specifically, the persistence layer 11 is utilized in the field composer 2 of the present invention, and also to allow the central server 8 to communicate with the database 7.

Figure 3:
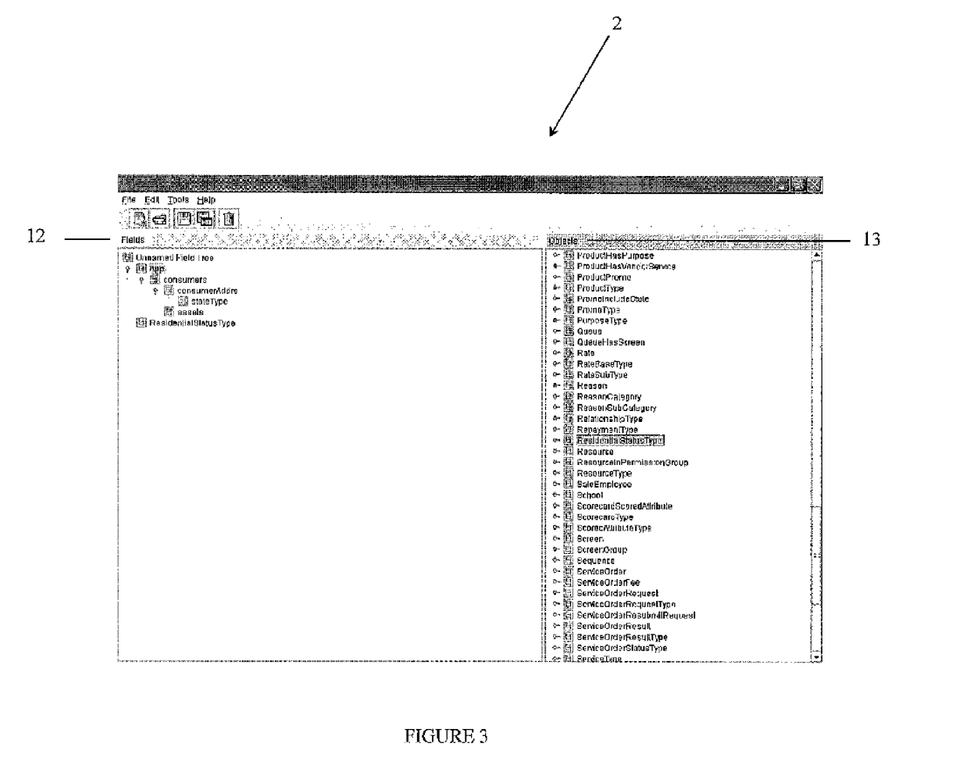
FIG. 3 is an example of the database schema view displayed in the field composer of the present invention.

The persistence layer 11 is used within the field composer 2 to create a relational view of the data model 5. Referring to FIG. 3, the field composer 2 presents a relational data model (in the data model view 13), and the business user drags and drops desired data elements (database structures) onto a field tree 12 to create a hierarchical visual representation of the data model for use in the design composer 3 (see FIG. 5). The field tree 12 maps the data elements to the database 7, which typically means that each data element in the field tree corresponds to a table or column in the customer database 7. The field tree 12 also displays in the design composer 3 in the form of a hierarchical data model for use in designing and building pages.

The persistence layer 11 is also used by the central server 8 after data has been entered into the automated business system by end users (through the client 9) in the runtime environment 10. Specifically, the persistence layer 11 translates data entered by the end user back to the database 7. The purpose of the invention is to build pages for an automated business system that collects, stores, and displays data from a database. This system connects with a database 7 that matches the data model 5 selected by the business user in the field composer 2.

The end user accesses the automated business system in the runtime environment 10 to enter, edit and review existing data. When the end user is finished, the data is transmitted to the central server 8, which stores the information back to the database 7 via the persistence layer 11. The persistence layer 11 translates the entered data to the native database query format of the database 7. This process allows the automated business systems created with the invention to be database-independent. In a preferred embodiment, Java Database Connectivity (JDBC) is used to connect the runtime environment 10 to the database 7.

C. Field Composer

The field composer 2 of the present invention is a tool from which a hierarchical view of a relational data model is created for subsequent use in the design composer 3. Referring to FIG. 3, the field composer 2 (through the persistence layer) interrogates the relational data model structure that is contained in the data model 5 and displays that structure in the data model view 13 of the field composer 2. In order to accomplish this, the field composer 2 connects to a database using a data model that corresponds to the database and analyzes the entity classes within the object model of the database along with the database metadata available from the database itself to derive the entities and fields to present in the data model view 13.

Figure 4:
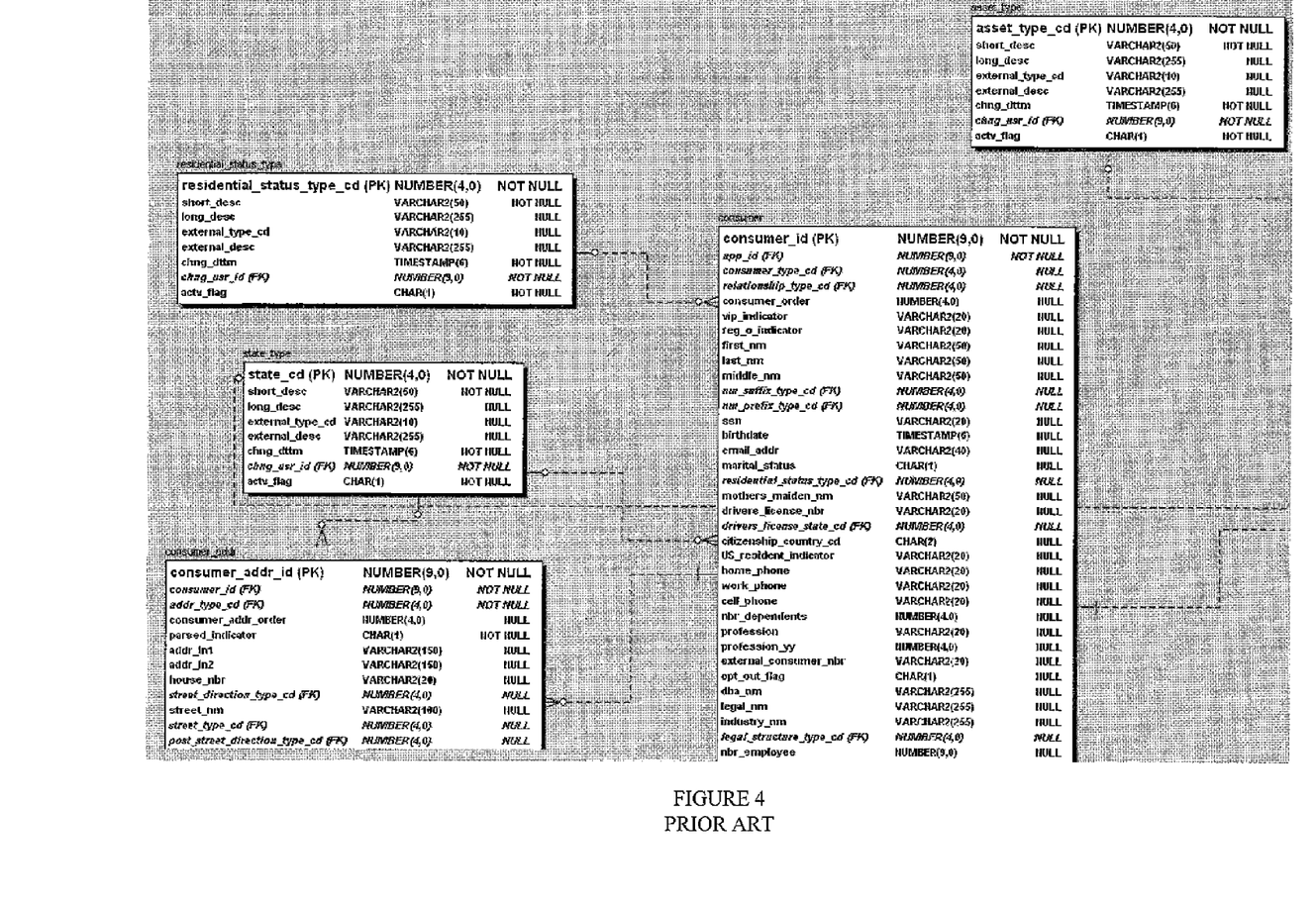
FIG. 4 is an illustration of a typical prior art database schema view.

The invention uses the persistence layer 11 to convert the complex database structure of the relational data model (see FIG. 4) to an object model that is easy for non-technical business users to understand. The field composer 2 allows business users to choose the data model they wish to use (from the File menu) and to select the specific fields they wish to use on their pages.

In a preferred embodiment, all available fields within the selected data model will appear in the data model view 13 of the field composer 2. The data model view 13 displays the fields available for use within the selected data model. Business users drag fields from the data model view 13 and drop them onto the field view 12, thereby creating a field tree.

As each field is selected, the business user can name it. The present invention also allows for renaming of pre-existing fields within the view of the data model. To change the original name of a field, the business user highlights the field name and selects Rename from the Edit menu. The business user is then prompted to type in the new name. Although the new name is displayed in the field composer for use in building new pages, the new name does not change the actual name within the data model.

After the user selects the desired fields from the data model with the field composer, the selected fields are saved and grouped according to the data model from which they came. These fields are then used when the business user goes on to build subsequent pages in the design composer 3.

FIG. 3 is an example of the database schema view displayed as a data model in the field composer of the present invention. This figure illustrates how the invention simplifies the database view shown in FIG. 4 and displays it in the field composer in a way that makes it easy for non-technical business users to understand. As shown in FIG. 3, the field composer comprises a field view 12 and a data model view 13. The data model view 13 shows the full list of fields available for the business user to select within the field composer 2. The field view 12 shows the list of fields after they have been selected by the business user in the field composer.

In a preferred embodiment, a field tree may be built from more than one data model 5. Each new data model 5 is represented by a new root in the field tree 12. In turn, each data model 5 is derived from a database schema. If multiple data models 5 are used to build a field tree 12, then the present invention will use multiple databases. The number of data models in the field tree will correspond to the number of databases utilized in the present invention. The database schema from which the data model was derived must correspond to the database schema for the database 7 that is used by the present invention in the runtime environment.

D. Design Composer i. Creation of Pages and Frames

Figure 5:
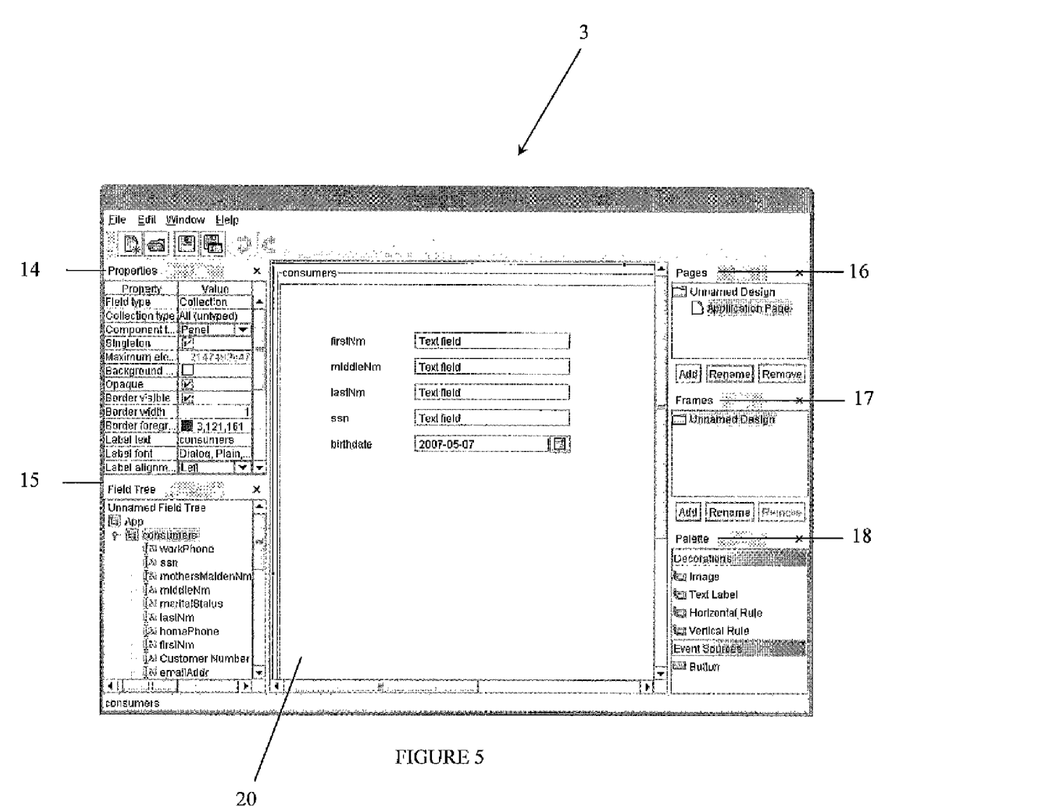
FIG. 5 is a screen shot of the design composer of the present invention with the properties, field tree, pages, frames and palette windows shown.

The design composer 3 is a tool for building the automated business system using the field tree 21 that was created in the field composer 2. Specifically, the design composer 3 allows business users to configure the visual display of their automated business system pages. FIG. 5 is a screenshot of the design composer 3 and shows the properties 14, field tree 15, pages 16, frames 17, and palette 18 windows. The canvas 20 is the area within the design composer where business users design, build and modify the pages of their automated business systems.

The properties window 14 allows business users to format design elements of their page, such as fonts, fields and colors. All formatting of any design element used in the canvas 20 is done through the properties window 14. The field tree window 15 allows business users to choose the fields they want to use on their page. The pages window 16 allows business users to add, delete, modify and rename pages of their automated business system. It also displays a list of the pages used in the automated business system and provides the ability for business users to add programmer-created pages to their automated business system. The frames window 17 allows users to select frames as part of the page they are building. The palette window 18 allows business users to add design elements—logos, labels, images, rules, buttons, etc.—to their page. These design elements may then be formatted in the properties window 14. FIG. 5 shows a sample of fields being laid out in the canvas 20 using a tab style field format.

Figure 6:
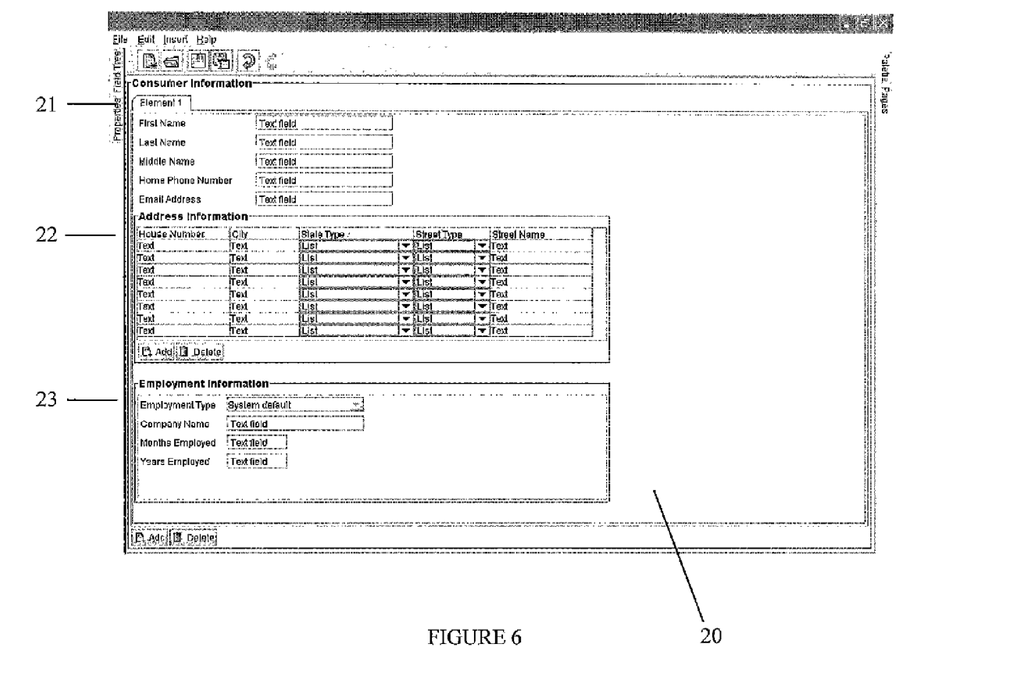
FIG. 6 is a screen shot of the design composer of the present invention with the properties, field tree, pages, frames and palette windows hidden.

In a preferred embodiment, the fields from the field tree 12 of the field composer 2 display in the field tree window 15 of the design composer 3. Referring to FIG. 5, to build a page, fields are selected from the field tree window 15 and placed onto the canvas 20. Fields are formatted in the properties window 14 and can be positioned anywhere on the canvas 20. In a preferred embodiment, the invention is a "WYSIWYG" (meaning "What You See Is What You Get"). As the page is created, the layout displayed on the canvas 20 is identical to that which will appear to end users in the runtime environment 10. FIG. 6 illustrates a variety of field type styles, including tab style 21, table style 22, and panel style 23.

The properties window 14 allows business users to modify field characteristics. It shows all the characteristics or "properties" associated with the selected fields, including, but not limited to, field or label font size, style or color, background color, and alignment. To change a specific characteristic of a field, business users highlight the field and modify it in the properties window 14. The properties window 14 is also where business users define the page flow of the automated business system by selecting the next page to display in the system. Page flow can also be controlled by events on buttons that have been dragged and dropped onto the canvas 20 from the palette window 18.

As shown in FIG. 5, a palette window 18 is also available for use within the design composer 3. The palette window 18 contains design elements such as images, vertical and horizontal rules, boxes, and labels that business users can add to the page. Design elements can be dragged-and-dropped onto the canvas 20 and arranged and sized on the canvas 20 as needed.

A second option for page creation also exists within the present invention in the form of programmer-created pages. Rather than selecting fields with the field composer, business users can open existing page templates from the design composer. These programmer-created pages can be modified to fit specific business needs. To modify a programmer-created page, the business user can change page properties and page flow just as he or she would with tool-created pages.

In addition to allowing business users to create pages, the design composer also provides the ability to create frames that can be reused across multiple pages. A frame is a template that can be embedded on a page and that may contain text, graphics, buttons, and any other design elements that may appear on a page. For example, a business user may wish to display a set of design elements on multiple pages of his automated business system. To create a frame, the business user selects "Add" from the frame window 17 and build the frame in the same manner in which he or she would build a page. The frame can then be reused throughout the design. When design elements are modified within the frame, the changes propagate to every place in which the frame is used in the design. In a preferred embodiment, predefined frames are available in the frame window 17 in the same way that predefined pages are available in the pages window 16. Programmer-created frames can be selected and utilized from the design composer.

Once the design is built in the design composer, the business user saves it to the design repository 4. When the designs are completed and ready to be run in the runtime environment 10, they are deployed from the design repository 4 to the central server 8. A design can be later reopened and edited, and modified designs are saved as new versions. In a preferred embodiment, the invention allows the business user to revert to a prior version of a design if necessary.

ii. Event-Action Methodology

In a preferred embodiment, pages built with the design composer use an event-action methodology whereby any number of intended actions can be associated with events that are triggered by the end user. Event-action methodology associates a specific event, such as a keystroke or mouse click, with a specific action. For example, when an end user initiates an event, such as clicking the "Save" button, the application may perform one or more actions, such as saving data, checking data for accuracy, and advancing the display page.

The following are examples of event-action methodology:

(1) Button Click—the event occurs when the end user clicks a specific button. Different actions may be associated with this event, such as advancing to the next display page, saving data, or closing a software application, (2) Page Flow—the event and subsequent action occur when entering one display page and leaving another. For example, within a Web browser, clicking the "Next" button sends the end user to the next page within the website. Clicking the button is the event, and entering the new page is the action. There may also be other actions associated with this event. For example, data may be saved before entering the new display page.

(3) Field Exit—the event occurs when the end user directs the cursor to leave the specific field. The action associated with this event might be to check the validation of data entered into the field.

iii. Field Validation

The design composer also provides the ability to define validation logic for each screen field (through the properties window 14). Validation logic allows business users to define the format and length or range of the information that can be entered into a field. For example, Social Security Number may need to be validated to ensure that it contains nine characters that are all numeric. More complex validations can be conducted, such as checking to see if the first three characters are zero, which would indicate that the number is invalid.

Validation rules are enforced at runtime. When the system determines that input is invalid, the system can display an error message or instructions on how to fill in the field correctly in the form of popup messages shown when the mouse pointer hovers over the field. More complex actions can be defined based on the validation of the field input (again through the properties window 8), such as making fields conditionally required based on the input of other fields.

The designer selects pass, warn or fail behavior for fields that fail to validate at runtime. Upon leaving the page or initiating the save action, if the page contains any invalid field with the fail behavior specified, the user is notified, and the action is prevented. Otherwise, if any invalid field has the warm behavior specified, the user is asked whether or not to perform the action.

iv. Event Sources

An event source is an interface element, such as a button, with which a computer user initiates an action. The event source triggers an action to be performed by the system in the runtime environment. In the design composer, business users can select various event sources to use on their pages. For example, they may select a "Continue" button to display at the bottom of each page. After dragging and dropping the "Continue" button onto the design composer from the palette window 18, the business user selects a corresponding action from the properties window 14 to apply to the button (widget) that links the button to a specific action. The "Continue" button may initiate different actions, depending on the action associated with it. For example, a business user may decide to link the "Continue" button to the action of advancing to the next page. The range of actions that can be assigned to an event source is wide. Other examples include calls to decisioning or workflow engines and calls to external data sources.

3. Design Repository

A. Design Storage and Library

Design takes place in the design environment 1. In this phase, business users are in the process of configuring the pages of their design to create the desired layout and flow of their automated business system. The design repository 4 stores the artifacts that will eventually be used to create the automated business system that will be utilized by end users in the runtime environment 10. It is also used as a testing environment in which a business user can test his automated business system before it is deployed to the runtime environment 10.

The design repository 4 also acts as a central library where artifacts can be stored and shared across multiple platforms and between other end users if permissions allow. Permissions to access the central libraries are defined by the business users in the individual libraries, which are accessed through the administrative sections of the design composer. Complete predefined software applications can also be designed and shared, or sold as templates for standard automated business systems.

B. Deployment Tool

The deployment tool is used to manage deployment of designs to the runtime environment. This tool interacts with the design repository 4 and runtime environment 10 to deploy instances of the server software itself along with a design and its associated artifacts, such as data model(s) 5 and programmer-created pages and frames. The deployment tool also can be used to start and stop and monitor the central server.

The design repository 4 uses the deployment tool to provide the business user with the ability to quickly deploy and exercise a single design, and, when the user is finished, shut down and discard the server software.

4. Runtime Environment

End users work in the runtime environment 10, where all of the components of the invention are integrated to create a complete automated business system. The end user accesses the pages of the specific automated business system to enter, edit, or review data that is transmitted back to the system for storage to the database. Display pages and data fields cannot be created or modified in the runtime environment; data can only be entered. The runtime environment can also be used to perform integration testing of all the components of the complete automated business system to verify that it is performing as expected.

A. Central Server

After retrieving the artifacts (such as pages) from the design environment 1, the deployment tool loads them onto the central server 8. End users access specific automated business systems by connecting to the central server 8 in a variety of ways. In a preferred embodiment, access occurs via secure Internet connection, such as an HTTP over SSL (HTTPS).

The central server 8 provides a similar function as the design repository 4, the difference being that the design repository 4 is a development holding place (and design library and testing environment) for the designs, while the central server 8 is where the completed automated business system is executed.

In a preferred embodiment, the central server 8 also receives data entered by end users into the automated business system in the runtime environment 10. The central server 8 receives data and passes it through the persistence layer 11, where the data is translated to the native database query format of the database 7. Once translated, data is stored in the database 7 that corresponds to the data model 5 that was initially selected by the business user in the field composer 2.

B. Security

In a preferred embodiment, the runtime environment 10 provides authentication and authorization for the automated business systems that are built with the present invention. The runtime environment 10 is preferably engineered to process transactions for automated business systems that operate in the most security intensive industries in the world. In today's environment, all data that is entered into the system and transmitted over any network must be encrypted so that personal data is not exposed and the credentials used to perform each transaction are authenticated. Even data inside the central server in transit to the database or other services may need to be encrypted. In the preferred embodiment, therefore, all traffic between the business user and the central server is preferably 128-bit encrypted over an SSL Internet connection and 128-bit encrypted over the internal network between the central server and the database.

In a preferred embodiment, the runtime environment 10 also provides for authorized user access to pages, frames and/or fields. Three basic levels of access include: modifiable, where the user can view and/or modify the pages, frames and or fields; viewable, where the user can view but not modify the pages, frames and/or fields; and none, where the user cannot view or modify the pages, frames and/or fields.

Design elements are assigned security categories at design time in the design composer 3. Authorization is managed at runtime using the security management features in the client 9, where authorizable objects such as groups of users are assigned levels of access to the security categories within the design.

The permission schema is flexible and allows business users to set up security for all types of automated business systems, including high-traffic systems with hundreds of pages, as well as low-traffic systems with only one or two pages.

User creation, deletion, and configuration of password parameters, such as password strength and aging, are accomplished at runtime using the security management features in the client 9.

C. Server Distribution

In a preferred embodiment, the runtime environment 10 is designed to scale; therefore, it can handle vast automated business systems with extremely high traffic to provide mission-critical processing services. It works in a distributed processing environment where additional servers can be added to the central server network at any point and transactions can be routed to available servers in real-time to balance the load as data enters the system. If a server fails, the transaction triggers notification to the other portions of the system, as well as the system administrator, so that the transaction can roll back and the specified server can be removed from the system.

In a preferred embodiment, multiple servers are placed in processing farms, which are located within geographically distributed processing facilities. Preferably, each processing facility is a Class 1 Computer Facility with SAS 70 Certification.

5. Advantages Over Prior Art

The present invention allows for a radical decrease in the development time of automated business systems, significantly reducing development costs and time-to-market, which in turn increases return on investment and overall efficiency for the companies who use automated business systems.

The present invention advances the current state of art in a number of ways. One of the key features of the invention is its ability to work within an existing development and runtime environment. The invention has also been designed to provide non-technical business users with unprecedented control over their automated business system builds. Business users are able to design, build, and deploy automated business systems without intervention by software engineers. Through the use of the invention, the creation of standard application pages can be completed in one to two hours, rather than the 50 to 100 hours it takes in a typical software application development environment.

Because the invention is user-friendly, business user frustration is drastically reduced in the page-building process. The amount of time required to test the system to ensure it functions properly has also been streamlined through the implementation of the data modeling standard. By employing this standard, the system eliminates the need for testing specific design elements and designs. Additionally, the invention allows for artifacts (such as page designs) to be saved and reused. The saved artifacts can then be used as templates for future automated business system builds.

The ability of the present invention to work generically across all industries and with multiple database technologies is another important differentiator from the systems available in today's market. The invention's handling and rendering of complex data in a user-friendly design environment is one of the most innovative capabilities of the invention. The invention is capable of reading database structures from a wide variety of data structure technologies, allowing the invention to adapt to any environment and be used to build any type of automated business system without the need to employ software engineers. Once the invention has read the data model, it automatically generates the database interactions through the persistence layer, which is necessary to store and retrieve data. The process that reads the data structure allows selective data from the overall structure to be viewed in a user-friendly format by business users from within the invention.

Another differentiator of the present invention is its ability to meet the stringent security constraints required of automated business systems in the modern world. In addition to handling sensitive data, the system provides business users with the ability to set up and enforce permissions and security so that each page and its associated artifacts can be restricted or allowed appropriately. Business users define the rights and permissions for each end user depending on specific business requirements.

Lastly, the present invention has been designed to allow the addition of programmer-created pages and frames into the overall automated business system. These programmer-created pages and frames can be saved in the design repository in the same way that the tool-created pages and frames are saved. Programmer-created pages, frames and actions allow for even greater technical functionality to be added to the automated business system, thereby providing an easy way for non-technical business users to implement complex functionality that could not otherwise be added through the design environment.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A system for rapid development of software applications comprising:
    (a) a memory and a processor;
    (b) a field composer run on a local computer;
    (c) a design composer run on a local computer; and
    (d) a design repository that is used to test the software applications before they are deployed to a runtime environment;
    (d) a central server; and
    (e) a deployment tool that interacts with the design repository and the runtime environment to deploy instances of server software along with a design and associated artifacts;
    wherein the field composer creates a hierarchical view of a relational data model for subsequent use in the design composer, the relational data model comprises a relational data model structure, and the field composer comprises a persistence layer that interrogates the relational data model structure and displays the relational data model structure in a data model view of the field composer;
    wherein the relational data model created by the field composer corresponds to a relational data model of a database, and the field composer connects to the database using the relational data model created by the field composer and analyzes entity classes within an object model of the database along with database metadata available from the database to derive entities and fields to present in the data model view;
    wherein after a user selects desired fields from the relational data model created by the field composer, the selected fields are saved and grouped according to the relational data model of the database;
    wherein the field composer creates field trees, each field tree comprises one or more relational data models, each relational data model is represented by a new root in the field tree, each relational data model is derived from a database schema corresponding to a database schema for a database that is used in the runtime environment, each field tree comprises a certain number of relational data models, the runtime environment comprises a certain number of databases, and the certain number of relational data models in the field tree corresponds to the certain number of databases in the runtime environment;
    wherein the design composer is used to create designs using the field trees created by the field composer and provides an ability to create frames for use across multiple pages;
    wherein the fields selected by the user with the field composer are displayed in a field tree window of the design composer;
    wherein the user creates a page of an automated business system by selecting fields from the field tree window and placing them onto a canvas;
    wherein a design is a partial or complete configuration of a software application;
    wherein the design repository stores the designs, the field trees, and the relational data models created by the field composer;
    wherein the persistence layer allows the central server to communicate with the database(s) in the runtime environment and translates data entered by the user into the automated business system back to the database(s);
    wherein after the data modeling standard is used to automatically infer the structure of the database schema of the database corresponding to the relational data model created by the field composer, the relational data model is derived using a reverse engineering tool;
    wherein the relational data model is updated by updating the database schema from which the relational data model is derived and recreating the relational data model to include changes to the database schema;
    wherein the system automatically generates all database interactions based on fields placed on a page by the user and allows users to define individual page layout, page groupings, and page navigation;
    wherein a customer database has a native database query format, and wherein the persistence layer translates the data entered by an end user to the native database query format of the customer database;
    wherein the relational data models are derived from different types of databases;
    wherein the persistence layer is an application programming interface that communicates with an object model persistence application programming interface; and
    wherein the runtime environment provides for user permissions, and wherein the user permissions include permissions for accessing the application.

2. The system of claim 1, wherein a design comprises programmer-created pages, programmer-created frames, tool-created pages, and/or tool-created frames.

3. The system of claim 1, further comprising a client,
    wherein the client displays in a runtime environment the software application that is created in the design composer; and
    wherein an end user enters, edits and/or reviews data through the client using the software application that is created in the design composer.

4. The system of claim 3, wherein the customer database is used by the software application to store and retrieve data entered by the end user through the client.

5. The system of claim 1, wherein more than one relational data model is used per software application created in the design composer.

6. The system of claim 1, wherein a data modeling standard is used to automatically infer the structure of the database schema of the database corresponding to the relational data model created by the field composer.

7. The system of claim 1, wherein the field composer comprises a data model view and a field view;
    wherein each relational data model created by the field composer comprises fields;
    wherein the data model view is automatically populated with the fields from the relational data model(s) created by the field composer; and wherein to create a field tree in the field composer, a business user drags and drops data elements from the data model view to the field view of the field composer.

8. The system of claim 7, wherein the field tree created in the field composer and displayed in the field tree window of the design composer maps the data elements to one or more customer databases.

9. The system of claim 1, wherein the persistence layer is an application programming interface that communicates directly with one or more relational data models.

10. The system of claim 1, wherein the persistence layer is used within the field composer to create a hierarchical view of a relational data model.

11. The system of claim 10, wherein the hierarchical view of the relational data model is displayed in the data model view of the field composer.

12. The system of claim 1, wherein each relational data model created by the field composer comprises fields, and wherein the field composer allows business users to select relational data model(s) and specific fields from a relational data model for use on specific pages of the software application.

13. The system of claim 12, wherein the field composer comprises a data model view and a field view, wherein all available fields within a selected relational data model appear in the data model view of the field composer, and wherein the selected fields appear in the field view.

14. The system of claim 1, wherein a single field tree is created for each software application, and wherein the design composer is used to build the software application using the field tree that is created in the field composer.

15. The system of claim 1, wherein the software application comprises one or more pages, wherein each page comprises a visual display, and wherein the design composer is used to configure the visual display of the pages in the software application.

16. The system of claim 1, wherein the design composer comprises a properties window, a field tree window, a pages window, and a palette window.

17. The system of claim 16, wherein the design composer further comprises a frames window.

18. The system of claim 16, wherein the software application comprises one or more pages, and wherein the canvas is where business users design, build and modify the pages of the software application.

19. The system of claim 16, wherein the software application comprises one or more pages, wherein the pages comprise design elements, and wherein the properties window is used to format the design elements of the pages.

20. The system of claim 16, wherein the software application has a page flow, and wherein the page flow is defined in the properties window.

21. The system of claim 16, wherein the software application has a page flow, and wherein page flow is controlled by events on buttons that have been dragged and dropped onto the canvas from the palette window.

22. The system of claim 16, wherein the software application comprises one or more pages, and wherein the pages window is used to add, delete, modify and rename pages.

23. The system of claim 22, wherein the pages window allows a business user to add programmer-created pages to the software application.

24. The system of claim 16, wherein the software application comprises one or more pages, and wherein the palette window is used to add design elements to a page.

25. The system of claim 24, wherein the design elements that are added from the palette window are arranged and sized on the canvas.

26. The system of claim 25, wherein a user selects a button from the palette window, drags and drops the button onto the canvas, and selects an action from the properties window to apply to the button.

27. The system of claim 26, wherein the software application comprises one or more pages, and wherein the frames window is used to add one or more frames to a page.

28. The system of claim 27, wherein each frame comprises one or more design elements, and wherein when a design element in a frame is modified, the modification propagates to every place in a design in which the frame is used.

29. The system of claim 1, wherein the fields placed onto the canvas form a layout, and wherein the layout displayed on the canvas is identical to that which will appear to an end user in a runtime environment.

30. The system of claim 1, wherein when a design is completed, the design is saved to the design repository.

31. The system of claim 30, wherein modified designs are saved as new versions, and wherein both new and prior versions are available for use in the design composer.

32. The system of claim 1, wherein when a design is completed and ready to be run in a runtime environment, the design is deployed from the design repository to the central server.

33. The system of claim 1, wherein the designs, fields trees and relational data models that are stored in the design repository are shared across multiple platforms and between end users.

34. The system of claim 1, wherein the user permissions include permissions for accessing specific pages and permissions for accessing specific fields.

35. A method for rapid development of software applications comprising:
 (a) providing a field composer run on a local computer;
 (b) providing a design composer run on a local computer; and
 (c) providing a design repository that is used to test the software applications before they are deployed to a runtime environment;
 (d) providing a server; and
 (e) providing a deployment tool that interacts with the design repository and the runtime environment to deploy instances of server software along with a design and associated artifacts;
 wherein the field composer creates a hierarchical view of a relational data model for subsequent use in the design composer, the relational data model comprises a relational data model structure, and the field composer comprises a persistence layer that interrogates the relational data model structure and displays the relational data model structure in a data model view of the field composer;
 wherein the relational data model created by the field composer corresponds to a relational data model of a database, and the field composer connects to the database using the relational data model created by the field composer and analyzes entity classes within an object model of the database along with database metadata available from the database to derive entities and fields to present in the data model view;
 after a user selects desired fields from the relational data model created by the field composer, the selected fields are saved and grouped according to the relational data model of the database;

wherein the field composer creates field trees, each field tree comprises one or more relational data models, each relational data model is represented by a new root in the field tree, each relational data model is derived from a database schema corresponding to a database schema for a database that is used in the runtime environment, each field tree comprises a certain number of relational data models, the runtime environment comprises a certain number of databases, and the certain number of relational data models in the field tree corresponds to the certain number of databases in the runtime environment;

wherein the design composer is used to create designs using the field trees created by the field composer and provides an ability to create frames for use across multiple pages;

wherein the fields selected by the user with the field composer are displayed in a field tree window of the design composer;

wherein the user creates a page of an automated business system by selecting fields from the field tree window and placing them onto a canvas;

wherein a design is a partial or complete configuration of a software application;

wherein the design repository stores the designs, the field trees, and the relational data models created by the field composer;

wherein the persistence layer allows the central server to communicate with the database(s) in the runtime environment and translates data entered by the user into the automated business system back to the database(s);

wherein after the data modeling standard is used to automatically infer the structure of the database schema of the database corresponding to the relational data model created by the field composer, the relational data model is derived using a reverse engineering tool;

wherein the relational data model is updated by updating the database schema from which the relational data model is derived and recreating the relational data model to include changes to the database schema;

wherein the system automatically generates all database interactions based on fields placed on a page by the user and allows users to define individual page layout, page groupings, and page navigation;

wherein a customer database has a native database query format, and wherein the persistence layer translates the data entered by an end user to the native database query format of the customer database;

wherein the relational data models are derived from different types of databases;

wherein the persistence layer is an application programming interface that communicates with an object model persistence application programming interface; and wherein the runtime environment provides for user permissions, and wherein the user permissions include permissions for accessing the application.

36. The method of claim 35, wherein a design comprises programmer-created pages, programmer-created frames, tool-created pages, and/or tool-created frames.

37. The method of claim 35, further comprising providing a client,
wherein the central server connects to the design repository and retrieves designs, field trees and relational data model(s) created by the field composer;
wherein the client displays in a runtime environment the software application that is created in the design composer; and
wherein an end user enters, edits and/or reviews data through the client using the software application that is created in the design composer.

38. The method of claim 37, wherein the customer database is used by the software application to store and retrieve data entered by the end user through the client.

39. The method of claim 35, wherein more than one relational data model is used per software application created in the design composer.

40. The method of claim 35, wherein a data modeling standard is used to automatically infer the structure of the database schema of the database corresponding to the relational data model created by the field composer.

41. The method of claim 40, wherein after the data modeling standard is used to automatically infer the structure of the database schema of the database corresponding to the relational data model created by the field composer, the relational data model is derived using a reverse engineering tool.

42. The method of claim 35, wherein the field composer comprises a data model view and a field view;
wherein each relational data model created by the field composer comprises fields;
wherein the data model view is automatically populated with the fields from the relational data model(s) created by the field composer; and
wherein to create a field tree in the field composer, a business user drags and drops data elements from the data model view to the field view of the field composer.

43. The method of claim 42, wherein the field tree created in the field composer and displayed in the field tree window of the design composer maps the data elements to one or more customer databases.

44. The method of claim 35, wherein the persistence layer is an application programming interface that communicates directly with one or more relational data models.

45. The method of claim 35, wherein the persistence layer is used within the field composer to create a hierarchical view of a relational data model.

46. The method of claim 45, wherein the hierarchical view of the relational data model is displayed in the data model view of the field composer.

47. The method of claim 35, wherein each relational data model created by the field composer comprises fields, and wherein the field composer allows business users to select relational data model(s) and specific fields from a relational data model for use on specific pages of the software application.

48. The method of claim 47, wherein the field composer comprises a data model view and a field view, wherein all available fields within a selected relational data model appear in the data model view of the field composer, and wherein the selected fields appear in the field view.

49. The method of claim 35, wherein a single field tree is created for each software application, and wherein the design composer is used to build the software application using the field tree that is created in the field composer.

50. The method of claim 35, wherein the software application comprises one or more pages, wherein each page comprises a visual display, and wherein the design composer is used to configure the visual display of the pages in the software application.

51. The method of claim 35, wherein the design composer comprises a properties window, a field tree window, a pages window, and a palette window.

52. The method of claim 51, wherein the design composer further comprises a frames window.

53. The method of claim 51, wherein the software application comprises one or more pages, and wherein the canvas is where business users design, build and modify the pages of the software application.

54. The method of claim 51, wherein the software application comprises one or more pages, wherein the pages comprise design elements, and wherein the properties window is used to format the design elements of the pages.

55. The method of claim 51, wherein the software application has a page flow, and wherein the page flow is defined in the properties window.

56. The method of claim 51, wherein the software application has a page flow, and wherein page flow is controlled by events on buttons that have been dragged and dropped onto the canvas from the palette window.

57. The method of claim 51, wherein the software application comprises one or more pages, and wherein the pages window is used to add, delete, modify and rename pages.

58. The method of claim 57, wherein the pages window allows a business user to add programmer-created pages to the software application.

59. The method of claim 51, wherein the software application comprises one or more pages, and wherein the palette window is used to add design elements to a page.

60. The method of claim 59, wherein the design elements that are added from the palette window are arranged and sized on the canvas.

61. The method of claim 51, wherein a user selects a button from the palette window, drags and drops the button onto the canvas, and selects an action from the properties window to apply to the button.

62. The method of claim 52, wherein the software application comprises one or more pages, and wherein the frames window is used to add one or more frames to a page.

63. The method of claim 62, wherein each frame comprises one or more design elements, and wherein when a design element in a frame is modified, the modification propagates to every place in a design in which the frame is used.

64. The method of claim 35, wherein the fields placed onto the canvas form a layout, and wherein the layout displayed on the canvas is identical to that which will appear to an end user in a runtime environment.

65. The method of claim 35, wherein when a design is completed, the design is saved to the design repository.

66. The method of claim 65, wherein modified designs are saved as new versions, and wherein both new and prior versions are available for use in the design composer.

67. The method of claim 35, wherein when a design is completed and ready to be run in a runtime environment, the design is deployed from the design repository to the central server.

68. The method of claim 35, wherein the designs, fields trees and relational data models that are stored in the design repository are shared across multiple platforms and between end users.

69. The method of claim 35, wherein the user permissions include permissions for accessing specific pages and permissions for accessing specific fields.

\* \* \* \* \*